United States Patent
Morley

[11] 3,776,124
[45] Dec. 4, 1973

[54] AUTOMATIC SANDWICH GRILL
[76] Inventor: Fred W. Morley, 4519 Jamestown Ct., Indianapolis, Ind. 46226
[22] Filed: Feb. 14, 1972
[21] Appl. No.: 225,906

[52] U.S. Cl. ................................... 99/335, 99/373
[51] Int. Cl. ............................................. A47j 37/06
[58] Field of Search ............ 99/335, 323.9, 329 RT, 99/325, 327–328, 332, 348, 353, 355, 372–373, 377, 380, 385, 389, 391, 393, 450.4

[56] References Cited
UNITED STATES PATENTS

| | | | |
|---|---|---|---|
| 2,317,225 | 4/1943 | Schara | 99/373 X |
| 2,559,801 | 7/1951 | Sarchet | 99/380 |
| 2,719,903 | 10/1955 | Oertli | 99/372 UX |
| 3,312,161 | 4/1967 | Nanna | 99/372 X |
| 3,377,963 | 4/1968 | Anderson et al. | 99/348 |

FOREIGN PATENTS OR APPLICATIONS

| 251,206 | 9/1912 | Germany | 99/372 |
|---|---|---|---|

Primary Examiner—Harvey C. Hornsby
Assistant Examiner—Arthur O. Henderson
Attorney—Thomas P. Jenkins et al.

[57] ABSTRACT

An automatic sandwich grill in which upper and lower heated platens engage one or more sandwiches or bread slices with regulated continuous pressure, and a timer acts at the end of a variable cooking time to separate the platens and steeply tilt the lower platen to discharge the cooked product. The upper platen is yieldingly counterbalanced so as to press the sandwich with a regulated continuous pressure throughout the toasting. The lower platen is tiltable. A timer acts at the end of a cooking period to release a latch or actuate other mechanism to cause the platens to automatically separate and the lower platen to tilt to about 45° to discharge the toasted sandwich by gravity.

15 Claims, 9 Drawing Figures

AUTOMATIC SANDWICH GRILL

BACKGROUND OF THE INVENTION

This invention relates to a sandwich toaster or grill for simultaneously grilling both sides of a sandwich, or slices of bread. In such a grilling process, the opposite faces of the sandwich should be held in continuous contact with heated grill platens with substantially uniform and continuous pressure, and the pressure should be capable of regulation to suit different kinds and numbers of sandwiches and different bread textures. The grilling platens can be and desirably are heated to uniform temperatures. With such uniform pressure and temperature, the cooking can be controlled by automatic timing of the cooking cycle, and the sandwich should be removed from contact with both grills promptly when the desired doneness is reached.

Sandwich grills previously available do not fully satisfy these requirements. Commercial sandwich grills commonly use heavy platens maintained at uniform temperature and the upper platen is so mounted that it stays fixed in whatever position the operator puts it. This makes the initial pressure dependent in each case on the touch of the operator, and the pressure will vary from sandwich to sandwich without regulation. Moreover, the fixed-position of the upper platen will not continuously maintain the desirable pressure and contact with the sandwich as the sandwich shrinks or softens during the cooking cycle. Domestic type equipment commonly uses a relatively light upper platen which rests with its full weight on the upper face of the sandwich or sandwiches and pressure can not be adjusted to suit the character or number of the sandwiches being grilled. In present commercial and domestic sandwich grills, there is no provision for automatic timing of the cooking cycle, or for automatic removal of the sandwich from the platens when cooking is completed.

The present invention provides a simple and effective apparatus for grilling one or more sandwiches or bread slices simultaneously on both sides, with uniformly heated platens held in contact with the sandwiches under uniform but regulated pressure, under the control of an automatic timer which at the end of a predetermined cooking period actuates the mechanism to cause the platens to separate and the lower platen to tilt to a steep slope so that the sandwich is discharged by gravity and removed from contact with both platens.

Apparatus in accordance with the invention has a lower grill platen which is held in horizontal sandwich-supporting position throughout the cooking cycle, and an upper platen which is partially supported by adjustable yielding or counterbalance means so that a variable proportion of its weight acts to press it downward on the sandwich supported on the lower platen. A proportion of the weight of the upper platen thus exerts a uniform pressure on the sandwich throughout the cooking cycle and such pressure is adjustable by varying the proportion of the weight which is taken by the counterbalancing or yielding support. The platens are heated by thermostatically controlled heating elements which maintain them at uniform predetermined temperature. The length of the cooking period is controlled by a timer which at the end of such period actuates mechanism which causes the platens to separate and the lower platen to tilt to an angle of approximately 45°. In the preferred construction, the lower platen is pivotally mounted on an offset pivot axis and movable between a raised horizontal position and a lowered tilted position. The lower platen is held in its raised position by latch mechanism which is released by the timer at the end of the cooking cycle to allow the lower platen to drop from its horizontal position to its lowered tilted position so as to discharge the sandwich. Preferably, the timer is a bimetal element actuated by a heating coil which is energized when the platen is lifted to latched position, and the latch mechanism is arranged to release the platen only after the bimetal has first gone through both a heating step and a cooling step, so that when a sandwich is discharged, the mechanism is immediately ready for reuse. For this purpose, the platen is initially latched by a primary latch which is released at the end of the bimetal heating step, and a secondary latch which then holds the platen until the bimetal cools.

The capacity of the platen heating elements is desirably correlated with the mass of the platen bodies so that the platens will come to full cooking temperature within the length of a single cycle of the timer. This permits the grill to be brought to operative condition by cycling it with the timer through a single preheating cycle.

The platens may be coated with a non-stick coating such as a tetrafluoroethylene resin available on the market under the trademark "Teflon."

BRIEF DESCRIPTION OF THE DRAWINGS

The accompanying drawings illustrate the invention. In such drawings.

DESCRIPTION OF THE PREFERRED EMBODIMENT

Figure 6:
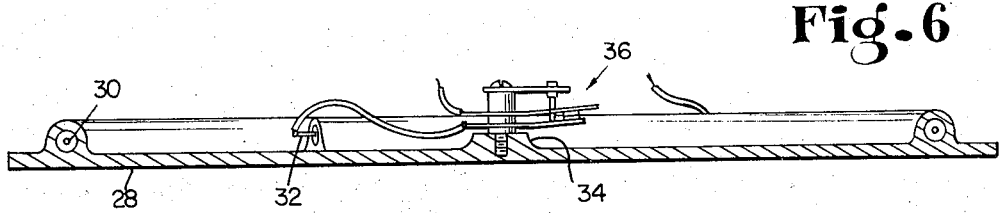
FIG. 6 is a section of such heating plate.
Figure 5:
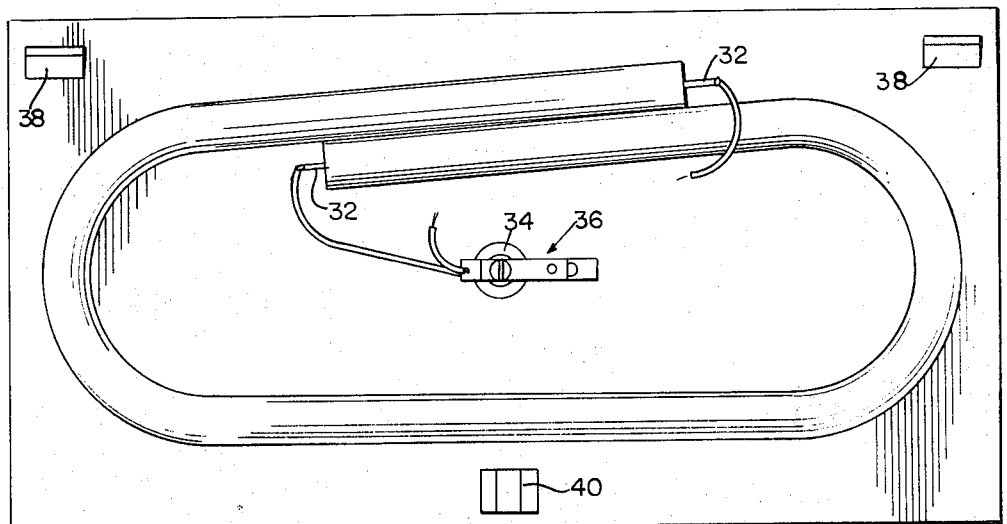
FIG. 5 is a rear view of a platen heating plate.

The automatic sandwich toaster shown in FIGS. 1-6 comprises a housing 10 adapted to stand on a table and having an upper vertical front wall 12 and a lower front wall 14 sloping at an angle of about 45°. The housing has closed end walls 16, a top wall 18 and a rear wall 20 which is perforated to ventilate the interior. A lower platen 22 and an upper platen 24 are supported from the housing by means described below. Each consists of a cover or pan 26 having a heating plate 28 mounted in its open side. As shown in FIGS. 5 and 6, each heating plate 28 has a heating element 30 cast in a rib on its back surface with terminals 32 projecting from its ends for connection to an electric power circuit. The center of the plate carries a mounting pad 34 to which a temperature control thermostat 36 is mounted. The plate may have molded clips 38 at its rear corners and a threaded boss 40 at its front side for purposes of mounting the plate in its pan 26. The heating plate 28 of the lower platen 22 desirably carries an upstanding flange 29 at its rear edge to serve as a fence to guide the location of a sandwich on the plate.

The lower platen 22 has a front handle 42 and is mounted on a spaced pair of cranked pivot arms 44. Each arm is pivoted on a pin 46 fixed to a bracket on the inner face of the vertical front wall section 12 at a point substantially coplanar with the top surface of the heating face of the lower platen. From that pivot point 46, the arm has a downward section 48, an angularly disposed section 50, and an arcuate section 52 extending in an arc about the pivot point 46. The arcuate section 52 may be hollow to pass lead wires for the heater element of the lower platen. The arcuate section 52 of each arm extends through an opening 53 in the inclined front wall 14 of the housing. Inwardly of such opening, the two arms 44 are interconnected by a cross bar 54 arranged to be engaged by the latches described below to support the lower platen 22 in its horizontal operative position as shown in full lines in FIG. 1. When the latches are released, the lower platen then drops to the inclined position shown in dotted lines in FIG. 1. A pair of shock absorbers 45 in the wall 14 cushion the fall of the platen to lowered position.

The upper platen 24 hangs from an arm 56 which is pivoted at its rear end to a bracket 58 on the top wall 18 of the housing. The arm 56 is rolled at its edges or otherwise shaped to enclose lead wires for the heater element 30 in the upper platen, and desirably carries a handle 57. Near its rear end, the arm 56 rests on a plunger 60 slidably mounted in a collar 62 and having a head at its lower end engaging a coil spring 64 housed in a cup 66 fixed to the upper wall 18. The spring-pressed plunger 60 partially offsets the weight of the upper platen 24, but is insufficient to fully support that platen 24 and the platen always tends to fall to a lower position. As shown in dotted lines in FIG. 1, the platen 24 lies substantially against the lower platen 22. Further downward movement is limited by engagement of the arm 56 with the housing. The effect of the spring plunger 60 is desirably adjustable, and adjustment is shown as provided by a rotary cam 68 mounted on the arm 56 and bearing against the plunger 60, which can be turned by a knob 70 to vary the relationship between the arm and the plunger.

Figure 1:
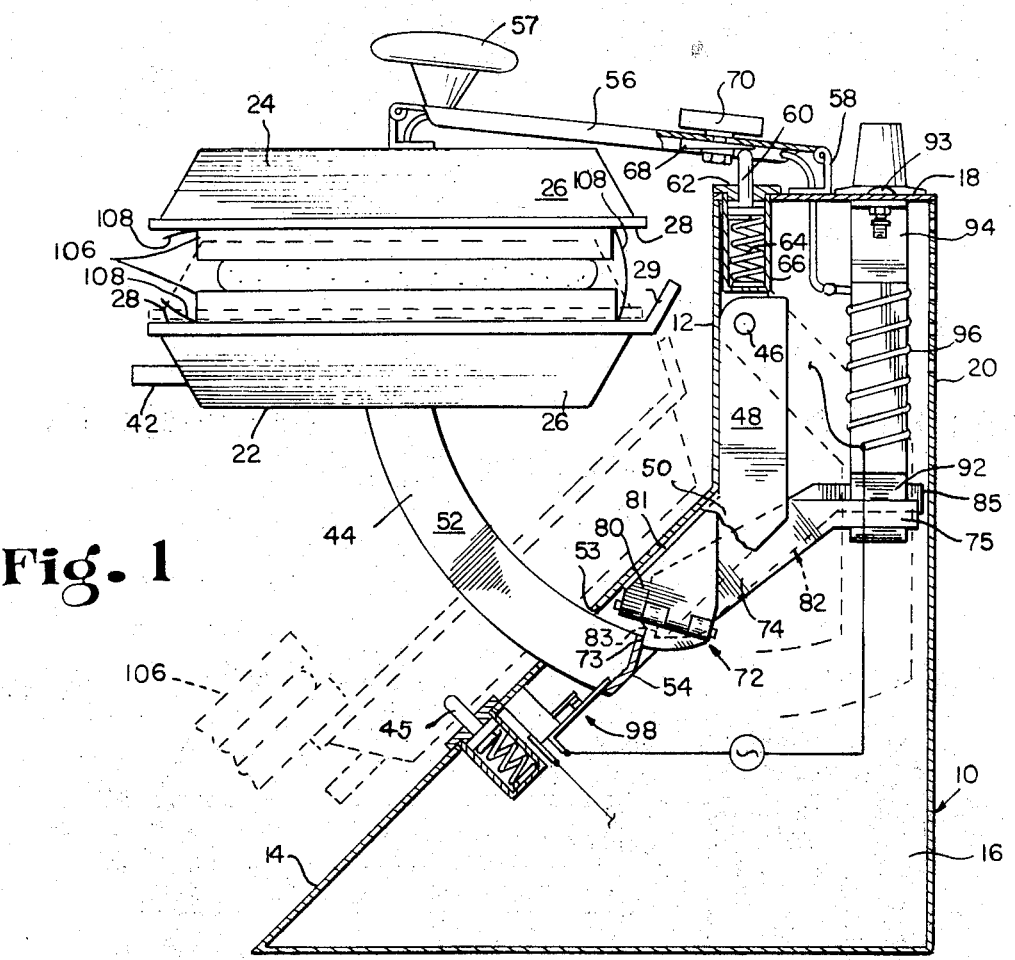
FIG. 1 is a side elevation of an automatic sandwich grill in accordance with the invention, partially shown in section.
Figure 2:
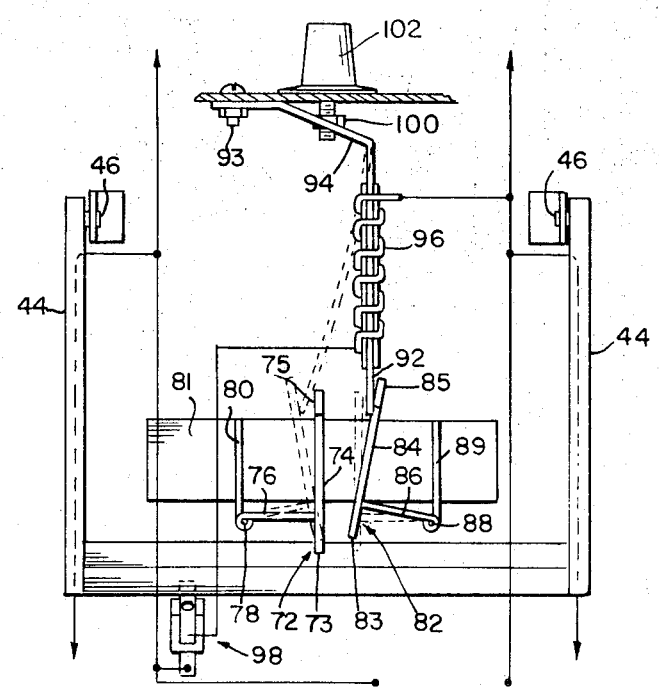
FIG. 2 is a rear elevation of the grill shown in FIG. 1.
Figure 3:
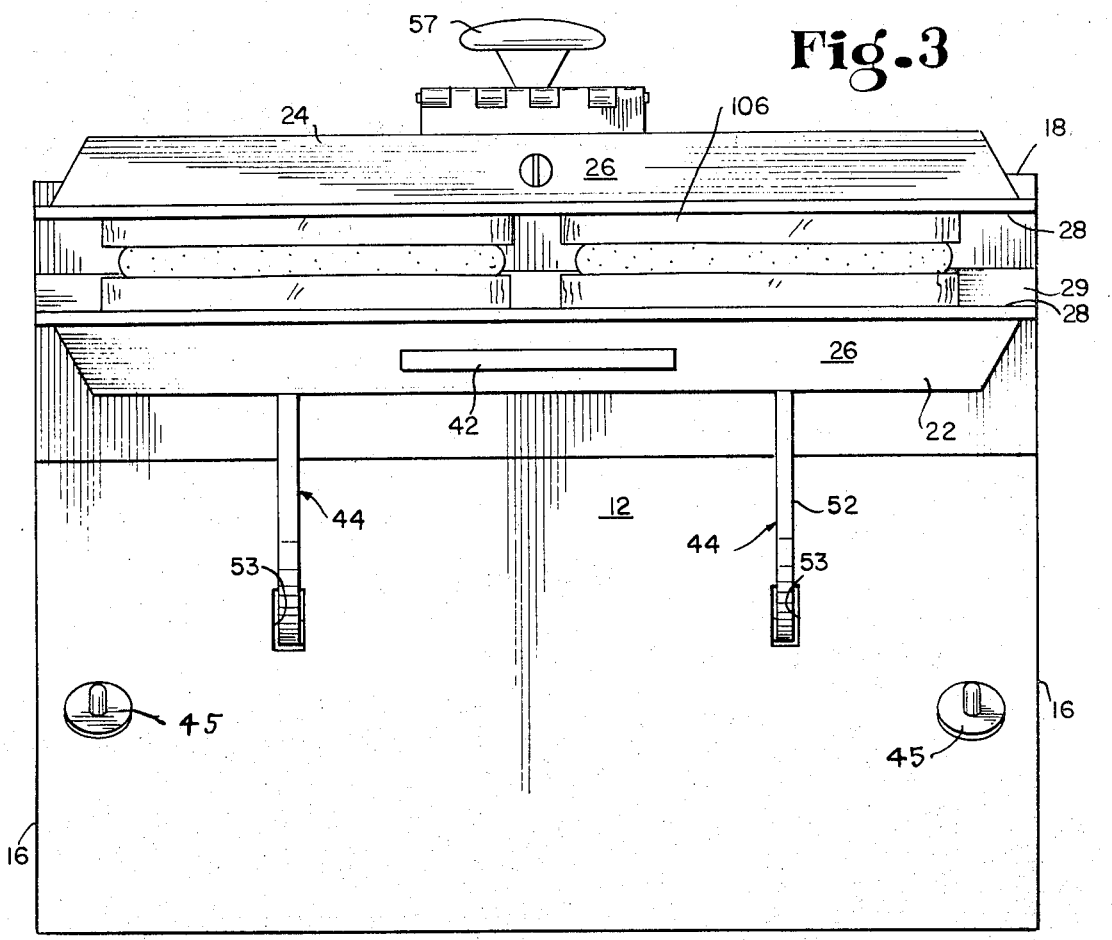
FIG. 3 is a front elevation of the grill of FIG. 1.
Figure 4:
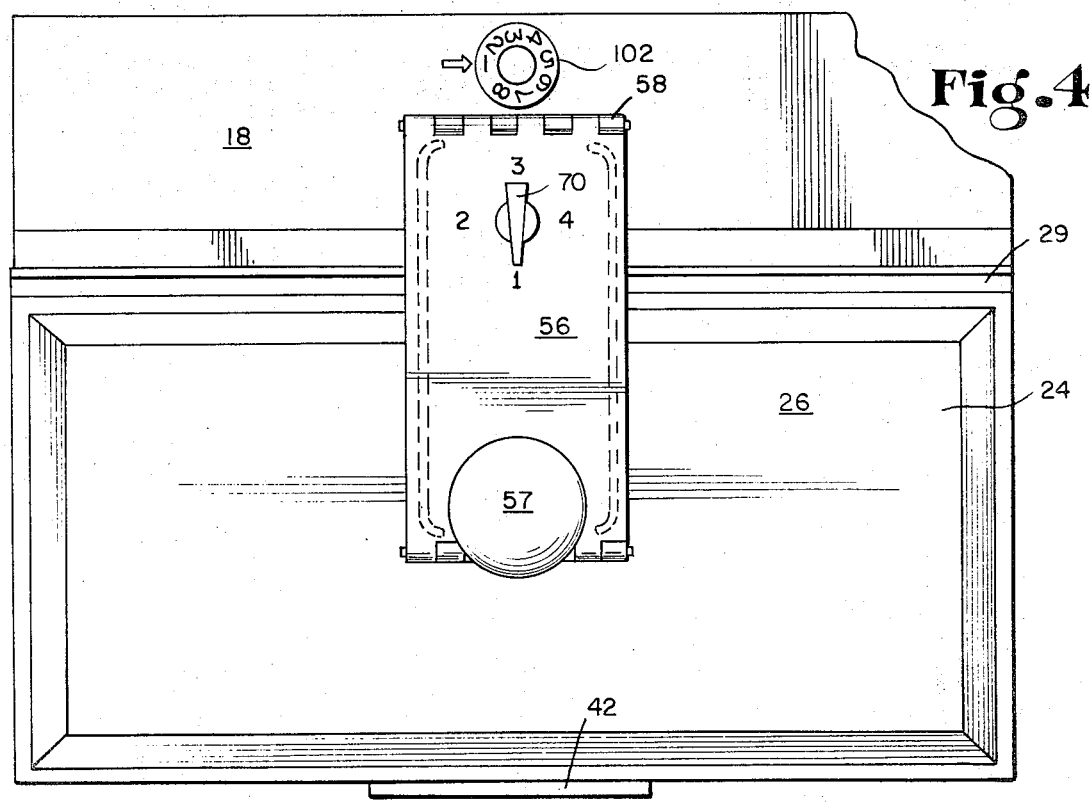
FIG. 4 is a plan view of the grill of FIG. 1.

The latch mechanism for the lower platen, and the timing mechanism, is shown in FIGS. 1 and 2. The arm assembly is held in fully raised position by a primary latch 72 consisting of a lever 74 fixed to an arm 76 which is pivoted by a pin 78 to a bracket 80 fixed to a plate 81 mounted on the inner face of the sloping front wall 14 of the housing. As shown in FIG. 1, the primary latch 72 has a latch nose 73 in position to engage the cross bar 54 between the pivot arms supporting the lower platen 22. Such cam nose 73 is located in a position to hold the lower platen 22 in fully elevated position.

When the cross bar 54 is released by the primary latch, it then moves a short distance, such as one-eighth inch and engages a secondary latch 82. This consists of a lever 84 fixed to an arm 86 which is pivoted by a pin 88 to a bracket 89 carried by the plate 81. As shown in FIG. 1, the latch lever 84 has a latch nose 83 adapted to lie behind the cross bar 54, at a position slightly spaced from that bar 54 when that bar is held in fully advanced position by the latch nose 73.

The primary and secondary latch levers 74 and 84 lie in spaced face-to-face relation with their supporting arms 76 and 86 extending in opposite directions, and with the two brackets 80 and 89 on opposite sides thereof. The two latch levers 74 and 84 have rearward projecting ends 75 and 85 by which they may be swung in opposite directions to retract their latch noses from the cross bar 54. The two latches are biased toward latched positions, as by light springs (not shown), and are moved to unlatched position by a bimetal blade 92. The blade 92 is mounted at its upper end from the top wall 18 of the housing, as by a bolt 93 at the end of an angularly disposed section 94. The blade 92 extends downward and its lower end lies between the rearwardly projecting ends 75 and 85 of the two latch levers 74 and 84. The arm normally engages the lever 84 to hold the secondary latch retracted. The bimetal arm 92 carries a heating coil 96, and is so arranged that in response to heating, it bends away from the latch arm 84 toward and against the latch arm 74, that is, to the left in FIG. 2 from the full line position shown to the dotted line position shown.

The energization of the heating coil 96 on the bimetal arm 92 is controlled by a normally open switch 98 which is held closed by the cross bar 54 when the lower platen 22 is in its fully elevated position, i.e., when the cross bar 54 is held by the primary latch nose 73, but is allowed to open when the cross bar is released by the primary latch and moves into engagement with the secondary latch nose 83. The coil is thus energized when the platen 22 is raised to fully elevated position and latched in place by the primary latch 72, and is deenergized when the primary latch is released.

In the full line position of the bimetal arm 92 its lower end holds the secondary latch lever 82 retracted from latching position. As the heated bimetal arm 92 swings to the left in FIG. 2, it allows the secondary latch arm 82 to move to latching position, and it then engages the primary latch lever 72 and moves that latch lever to disengaged position. This allows the bar 54 to move from the primary latch to the secondary latch, and such movement opens the switch 98 and deenergizes the heater coil 96 of the bimetal arm 92. The arm cools and swings back to the right. This allows the primary latch 72 to move toward latched position but it does not latch but strikes the edge of the bar 54. The cooling bimetal arm 92 then engages the secondary latch 82 to swing it to unlatched position, and this releases the cross bar 54 and allows the lower platen to swing downward to its steeply tilted position shown in dotted lines in FIG. 1.

The action of the bimetal arm 92 in controlling the primary and secondary latches 72 and 82 will thus control the time between when the heating coil 96 is first energized by movement of the lower platen to cooking position and when the secondary latch 85 is withdrawn to allow the platen 22 to drop from its cooking position to its delivery position. The heating and cooling cycle of the bimetal 92 thus controls the cooking period. The action of the bimetal arm 92 and the consequent length of the cooking period is adjusted by varying the normal position of the bimetal arm 92. For this purpose, the transverse leg 94 of that bimetal arm 92 is engaged by a nut 100 on the threaded stem of a control knob 102. Adjustment of the knob lengthens or shortens the time cycle.

Figure 7:
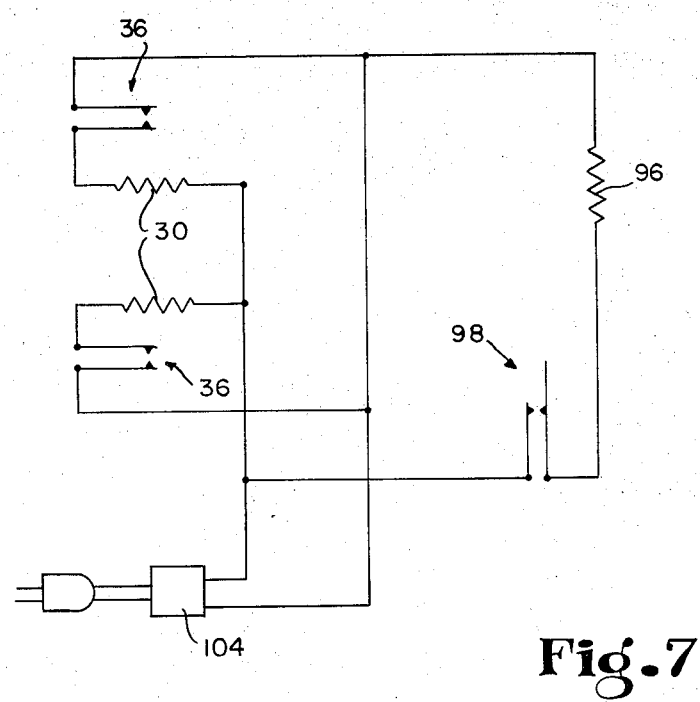
FIG. 7 is a wiring diagram.

As shown in the wiring diagram of FIG. 7, the power supply circuit to the grill may be controlled by an on/-off switch 104. When that switch is on, the heating elements 30 of both platens 22 and 24 are energized through their own individual thermostats 36, which maintain the platens at predetermined temperature. The heating coil 96 for the bimetal element 92 of the timer mechanism is connected across the circuit through the switch 98 so that it is not energized except when the switch 98 is closed by the cross bar 54 when that cross bar is latched in fully advanced position by the primary latch 72.

Operation is as follows. The grill may be stored with the platens in closed position, that is, with the lower platen 22 latched in fully raised position by the primary latch 72 and with the upper platen 24 resting against the face of the lower platen, so that the two platens are closed and protected from contamination. When the grill is connected to a supply circuit and the switch 104 turned on, the heating coils 30 of the two platens will be energized, as will the heater coil 96 of the timer mechanism. The timer will then cycle through a preheating cycle equal to a normal cooking cycle. It is assumed that the timer control knob 102 is appropriately set for the sandwich which is to be cooked. If the heating elements of the platen are properly coordinated with the head demand, the single preheating cycle will bring the platens to cooking temperature. At the end of such preheating cycle, the lower platen will drop to its discharge position as shown in dotted lines in FIG. 1.

For use, the lower platen is raised to its latched position, the upper platen is raised by its handle 57, a sandwich 106 is placed between the platens, and the upper platen is lowered against the upper face of the sandwich. The knob 70 may be rotated to adjust the pressure with which the upper platen rests on that sandwich. The sandwich will then be grilled or cooked in continuous contact with the platens 22 and 24 against its opposite faces. The platens will be at a predetermined temperature and will be held in contact with the sandwich with a continuous and uniform pressure. The amount of such pressure will depend on the adjustment of the knob 70 to control the relationship between the cam 68 and the spring plunger 60, and thereby vary the proportion of the weight of the upper platen 24 which is carried by such spring plunger 60 and by the sandwich. In the grill shown, two sandwiches can be grilled at once.

The cooking time will be controlled by the timer. When the lower platen 22 is raised to its fully raised position, it will be latched by the cam nose 73 of the primary latch lever 42, and the bar 54 will close the switch 98 to energize the heater coil 96. The bimetal arm 92 will then swing to the left in FIG. 1, will first allow the secondary latch lever 82 to move to latching position, and will subsequently release the primary latch lever 72. The lower platen will then drop slightly, but not sufficiently to affect the cooking, and the cross arm 54 will move rearward enough to open the switch 98. The bimetal arm 92 will then cool and swing to the right in FIG. 1 until it re-engages the upper end 85 of the secondary latch 82 and moves that secondary latch to released position as shown in full lines in FIG. 1. This will release the cross arm 54 from the latch mechanism, and will allow the lower platen to drop from its operative position shown in full lines in FIG. 1 to its delivery position shown in dotted lines in FIG. 1. This will dispose the upper surface of the lower platen at an angle of approximately 45°, which will cause the sandwich 106 to slide off that platen onto the table supporting the grill.

The sandwich 106 is thus grilled at a predetermined temperature, under a predetermined continuous pressure, for a predetermined time, with the pressure and time being variable by adjustment of the knobs 70 and 102. Upon completion of the cooking, the sandwich is automatically removed from the heated platens and discharged from the grill.

The action of the grill in delivering the sandwich or sandwiches from the inclined lower platen is found to be effective and reliable, especially when the platens are coated with a non-sticking composition such as "Teflon." In addition, I have found it advantageous to place each sandwich between layers or folds of aluminum foil 108, especially if the sandwich is buttered or has a drippy filling, which helps to keep the platens clean and reduce clean-up time, and to minimize the possibility of sticking which might interfere with the desired prompt delivery of the sandwich from the grill when it is done.

Figure 8:
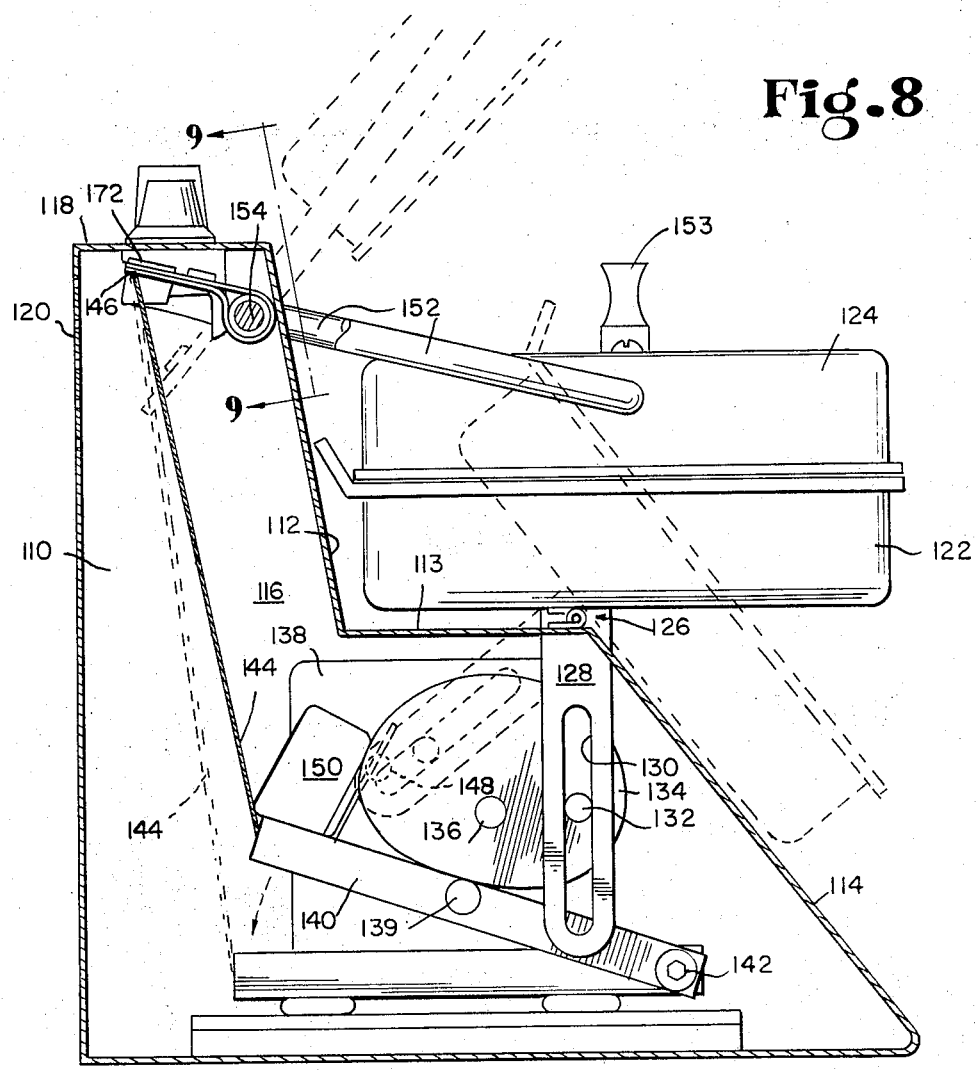
FIG. 8 is a side elevation of a modified sandwich toaster, with parts shown in section.

The modification shown in FIG. 8 comprises a chair shaped housing 110 having at its front a generally upright upper wall 112, a horizontal wall 113 and a lower sloping wall 114. It also has end walls 116, a top wall 118, and a perforated rear wall 120. The device includes two platens 122 and 124 of the same construction of those in FIG. 1. The lower platen is pivoted to the housing at the juncture between the horizontal wall 113 and the sloping wall 114, by a pair of spaced hinges 126. It is connected at its center to a stiff leg 128 which projects downward into the housing and is provided with an elongated central slot 130. The slot 130 is received over a pin 132 on the front face of a cam 134 mounted on a shaft 136 for rotation about the axis of that shaft. The shaft is driven through a gear reduction from a motor 138. The outer surface of the cam 134 bears on a cam follower 139 carried by a lever 140 pivoted to the fixed point within the housing on a pivot shaft 142. The outer end of the lever 140 is connected by a cable 144 to a lift lever 146 for the top platen 124. The back side of the cam 134 carries a switch-actuating pin 148 which, as shown, normally engages the switch lever of a normally closed microswitch 150 controlling the motor 138, to hold that switch in open position to deenergize the motor.

The motor is momentarily energized at the end of the cooking cycle by a switch in the timer mechanism. This rotates the cam 134 through an initial clockwise rotation sufficient to carry the switch actuating pin 148 out of engagement with the switch arm of the microswitch 150, and such switch then closes to maintain energization of the motor through one rotation of the cam. As the cam 134 rotates, it depresses the lever 140 to pull on the cable 144 and lift the top platen 124 from its full line position shown to its open dotted line position. Simultaneously, the cam pin 132 engaged in the slot 130 of the stiff leg, pivots that stiff leg about the axis of the hinges 126 and tilts the lower platen 122 from its horizontal position shown in full lines to its 45° position shown in dotted lines, at which it will discharge the sandwich from its surface onto the table on which the device stands. The cam then continues to bring the stiff leg 128 back to vertical position as shown in full lines, to allow the lever 140 to rise and lower the upper platen 124 to its full line position, and to carry the switch actuating arm 148 to a position to open the switch 150 and deenergize the motor.

The platen 124 is pivotally mounted between the arms 152 of a bail lever pivotally mounted by its cross bar 154 in bearings in the housing 110 at the upper end of the front wall 112. Intermediate its ends, the cross bar 154 carries the lift lever 146. Such lift lever is fixed to the bail lever so that when the cable 144 pulls downward on that lever 146, the bail arms 152 rise to lift the upper platen 124. The cable is long enough to allow the top platen to rest on the bottom platen.

Figure 9:
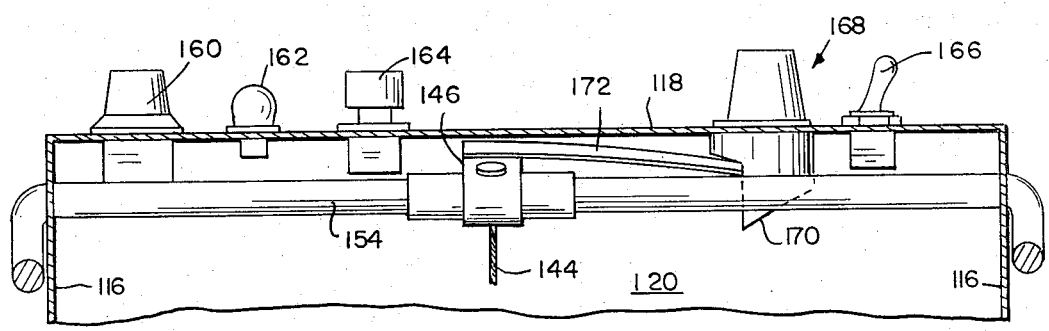
FIG. 9 is a partial section on the line 9—9 of FIG. 8.

As shown in FIG. 9, the top wall 118 of the housing 110 carries a control knob 160 for the time delay device, a signal light 162 which is on during the time delay cycle, a start button 164 for initiating the time delay cycle, and on/off switch 166, and a pressure adjusting knob 168. The pressure adjusting knob 168 rotates a helical cam member 170 which is in engagement with the end of a leaf spring 172 fixed to the end of the lift lever 146 on the bail bar 154. As the spring is stressed, it counteracts some of the weight of the upper platen 124, and thus varies the pressure which that weight exerts against the sandwich between the two platens 122 and 124.

The time delay mechanism controlled by the knob 160 may be of any desired form, either electrical, thermal, or mechanical. Its time cycle is initiated by actuation of the start button 164, and at the end of the cycle it serves to momentarily energize the motor 138 for a long enough period to allow the switch 150 to close to maintain energization of the motor for one cycle and until the cam 148 again opens the switch 150.

Operation is similar to that of the modification of FIG. 1. The lower platen 122 is normally in horizontal position as shown in full lines. The upper platen 124 normally rests on it, and the two are maintained at cooking temperatures under the control of their own thermostats as long as the grill is on. To insert a sandwich, the upper platen 124 is raised by its handle 153, the sandwich is laid on the lower platen 122, and the upper platen is then lowered against the upper face of the sandwich. The pressure it exerts against the sandwich is adjustable by rotation of the knob 168 to vary the stress is the counterbalancing spring 172, but some portion of the weight of the upper platen 124 will always be exerted on the sandwich and will remain substantially constant throughout the cooking cycle, even through the sandwich may shrink during that cooking. The timing cycle is initiated by depressing the start button 164, and such timing mechanism, at the end of the predetermined cooking time, momentarily energizes the motor and starts it on a one revolution cycle. This raises the upper platen 124 and to tilt the lower platen 122 to a 45° position, at which the sandwich slides off the lower platen onto the table. The cam action then returns the platen 122 to horizontal position and lowers the upper platen 124 to rest on the lower platen.

I claim:

1. An automatic sandwich grill, comprising a supporting housing,
    a lower platen having an upwardly-presented flat cooking surface and mounting means to support such platen in a horizontal cooking position and for movement therefrom to a steeply tilted discharge position at an angle of approximately 45° at which a sandwich thereon will slide forward off the flat surface thereof, right side up, onto a receiving surface, and at which its lower edge is disposed to lie closely above a receiving surface,
    an upper platen and mounting means to position the same over the lower platen to rest with continuous pressure on a sandwich on the lower platen when such lower platen is in horizontal cooking position,
    means to control the pressure exerted by the upper platen on the sandwich,
    heating means to maintain the platens at cooking temperature,
    timing means for timing the cooking time of a sandwich between the platens, and
    means responsive to completion of a timing cycle by said timing means and operative to cause said platens to separate from each other and the lower platen to move to its steeply tilted discharge position for causing a sandwich thereon to be slidably discharged by gravity therefrom, right side up, on to the receiving surface.

2. An automatic grill as in claim 1 wherein said pressure control means comprises counterbalancing means partially balancing the weight of the upper platen, and further comprising means to adjust the proportion of upper platen weight balanced by the counterbalancing means and thereby adjust the pressure exerted by the upper platen on the sandwich, and a manually operable handle exposed for adjustment by the operator and connected to regulate said adjusting means.

3. An automatic grill as in claim 1 in which the lower platen mounting means comprises a supporting arm connected to the platen and pivoted on a horizontal axis offset from the platen, said arm having a raised position in which it supports the lower platen in its horizontal cooking position and a lowered position in which it disposes the platen in its steeply-tilted discharge position.

4. An automatic grill as in claim 3 in which said housing comprises an upstanding upper portion and a lower portion having an inclined front face, and said arm disposes the lowered platen substantially against said inclined front face, and in which said arm has an outer portion extending in an arc about said pivot axis and projecting through an opening in said inclined front face.

5. An automatic grill as in claim 3 in which said responsive means comprises a latch means operative to latch the supporting arm in its raised position, the latch means being actuated to arm releasing condition by said timing means at the end of the timing cycle.

6. An automatic grill as in claim 5 with the addition of a handle on the lower platen for manually lifting the same from lowered position to latched raised position, and means responsive to movement of the lower platen to latched raised position for activating said timing means.

7. An automatic grill as in claim 1 in which the lower platen mounting means supports the platen for free tilting movement about an eccentric axis whereby the platen will drop to its tilted position if unsupported, and means to latch the platen in raised position, the latch means being actuated to arm releasing condition by said timing means at the end of the timing cycle.

8. An automatic grill as in claim 1 in which the responsive means comprises a motor-driven cam mechanism, the timing means being operative to initiate a caming action which first separates the platens and tilts the lower platen to discharge a sandwich thereon and then returns the platens to closed horizontal position.

9. An automatic sandwich grill, comprising a supporting housing, a lower platen and mounting means to support such platen in a horizontal cooking position and for movement therefrom to a steeply tilted discharge position, said mounting means comprising a supporting arm connected to the platen and pivoted on a horizontal axis offset from the platen, said arm having a raised position in which it supports the lower platen in its horizontal cooking position and a lowered position in which it disposes the platen in its steeply-tilted discharge position, an upper platen and mounting means to position the same over the lower platen to rest on a sandwich on the lower platen, heating means to maintain the platens at cooking temperature, timing means for timing the cooking time of a sandwich between the platens, and means responsive to completion of a timing cycle by said timing means and operative to cause said platens to separate from each other and the lower platen to move to its steeply tilted discharge position for causing a sandwich thereon to be discharged by gravity therefrom, wherein said responsive means comprises a primary latch operative to latch the arm in raised position when the same is lifted thereto from its lowered position, and a secondary latch for retaining the arm in raised position upon the release of the primary latch; and said timing means comprises a heat responsive element movable on heating to a first position in which it releases the primary latch and movable on cooling to a second position in which it releases the secondary latch to cause the arm to move from raised position to lowered position.

10. An automatic grill as in claim 9 with the addition of a heater for said heat responsive element and a heating circuit including a switch which is closed when the primary latch is engaged with said arm and is opened when the primary latch is released.

11. An automatic sandwich grill, comprising a supporting housing,
a lower platen having an upwardly-presented flat cooking surface, and mounting means to support such platen in a horizontal cooking position and for movement therefrom to a steeply tilted discharge position at an angle of approximately 45° at which a sandwich thereon will slide forward off the flat surface thereof, right side up, onto a receiving surface, and at which its lower edge is disposed to lie closely above a receiving surface.
an upper platen and mounting means to position the same over the lower platen to rest on a sandwich on the lower platen, the platens being biased and movable toward each other so as to maintain contact with the sandwich throughout the cooking cycle,
heating means to maintain the platens at cooking temperature,
timing means for timing the cooking time of a sandwich between the platens, and
means responsive to completion of a timing cycle by said timing means and operative to cause said platens to separate from each other and the lower platen to move to its steeply tilted discharge position for causing a sandwich thereon to be slidably discharged by gravity therefrom, right side up, on to the receiving surface,
said lower platen mounting means comprising a supporting arm connected to the platen and pivoted on a horizontal axis offset from the platen, said arm having a raised position in which it supports the lower platen in its horizontal cooking position and a lowered position in which it disposes the platen in its steeply tilted discharge position.

12. An automatic grill as in claim 11 in which the upper platen is movable downward a limited distance from its normal sandwich-engaging position and the lower platen moves a greater distance away from the upper platen whereby the sandwich is carried clear of the upper platen before it is tilted to discharge position.

13. An automatic sandwich grill, comprising a supporting housing,
a lower platen having an upwardly-presented flat cooking surface, and mounting means to support such platen in a horizontal cooking position and for movement therefrom to a steeply tilted discharge position at an angle of approximately 45° at which a sandwich thereon will slide forward off the flat surface thereof, right side up, onto a receiving surface, and at which its lower edge is disposed to lie closely above a receiving surface,
an upper platen and mounting means to position the same over the lower platen to rest on a sandwich on the horizontal lower platen, the platens being biased and movable toward each other so as to continuously maintain contact with the sandwich throughout the cooking thereof,
heating means to maintain the platens at cooking temperature,
timing means for timing the cooking time of a sandwich between the platens, and
means responsive to completion of a timing cycle by said timing means and operative to cause said platens to separate from each other and the lower platen to move to its steeply tilted discharge position for causing a sandwich thereon to be discharged by gravity therefrom, right side up, to the receiving surface, said lower platen mounting means comprising a pivotal support on a horizontal axis between its edges, supporting the platen for tilting movement without substantial movement away from the upper platen, and said responsive means operates to raise the upper platen and to tilt the lower platen.

14. An automatic grill as in claim 13 in which the responsive means comprises a motor-driven cam mechanism, the timing means being operative to initiate a caming action which first separates the platens and tilts the lower platen to discharge a sandwich thereon and then returns the platens to closed horizontal position.

15. An automatic grill as in claim 14 in which said cam mechanism includes a first cam operative to raise the upper platen and a second cam operative to tilt the lower platen.

* * * * *